United States Patent
Isaji et al.

(10) Patent No.: US 6,954,174 B2
(45) Date of Patent: Oct. 11, 2005

(54) RADAR APPARATUS FOR AUTOMOBILE, ATTACHMENT DIRECTION ADJUSTER AND ATTACHMENT DIRECTION ADJUSTING METHOD FOR RADAR APPARATUS

(75) Inventors: Osamu Isaji, Hyogo (JP); Hideki Kajioka, Hyogo (JP); Norihiko Hatanaka, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/849,784

(22) Filed: May 21, 2004

(65) Prior Publication Data

US 2004/0233094 A1 Nov. 25, 2004

(30) Foreign Application Priority Data

May 23, 2003 (JP) ........................................ 2003-146197

(51) Int. Cl.[7] ............................. G01S 7/40; G01S 13/93
(52) U.S. Cl. ................... 342/173; 342/70; 342/165; 342/174; 342/175; 342/195; 180/167; 180/169
(58) Field of Search .............................. 342/5–8, 10, 11, 342/20, 70–81, 147, 158, 165–175, 195; 180/167–169; 701/1, 29, 31, 36, 45, 300, 301

(56) References Cited

U.S. PATENT DOCUMENTS

| | | | | |
|---|---|---|---|---|
| 6,020,844 A | | 2/2000 | Bai et al. | |
| 6,026,353 A | * | 2/2000 | Winner | 342/70 |
| 6,335,705 B1 | * | 1/2002 | Grace et al. | 342/174 |
| 6,407,696 B1 | * | 6/2002 | Neben et al. | 342/70 |
| 6,476,760 B1 | * | 11/2002 | Winter et al. | 342/173 |
| 6,714,156 B1 | * | 3/2004 | Ibrahim et al. | 342/174 |
| 6,750,811 B2 | * | 6/2004 | Asanuma et al. | 342/174 |
| 6,778,131 B2 | * | 8/2004 | Haney et al. | 342/174 |
| 6,831,591 B2 | * | 12/2004 | Horibe | 342/174 |
| 2002/0000909 A1 | | 1/2002 | Koerber et al. | |
| 2004/0017308 A1 | * | 1/2004 | Kikuchi | 342/74 |

FOREIGN PATENT DOCUMENTS

| | | |
|---|---|---|
| DE | 38 19 683 A1 | 12/1989 |
| DE | 101 14 799 A1 | 10/2002 |
| JP | A 59-37471 | 2/1984 |
| JP | A 1-197684 | 8/1989 |

* cited by examiner

*Primary Examiner*—Bernarr E. Gregory
(74) *Attorney, Agent, or Firm*—Oliff & Berridge, PLC (57) ABSTRACT

A radar apparatus for a vehicle includes a casing, a correction member, and a selection indication. The casing includes a functional portion, which performs searching, and a reference surface. The correction member includes a plurality of correction surfaces. The selection indication indicates which one of the correction surfaces and the reference surface an attachment-direction adjustor is to be placed on during an attachment operation of the radar apparatus to the vehicle.

16 Claims, 7 Drawing Sheets

RADAR APPARATUS FOR AUTOMOBILE, ATTACHMENT DIRECTION ADJUSTER AND ATTACHMENT DIRECTION ADJUSTING METHOD FOR RADAR APPARATUS

BACKGROUND OF THE INVENTION

1. Field of the Invention

The present invention relates to a radar apparatus for an automobile attached to the body of the automobile, and an attachment direction adjuster and an attachment direction adjusting method for the radar apparatus.

2. Description of the Related Art

Conventionally, such a technique has been developed that a radar apparatus utilizing a radio wave or a laser beam is mounted on the body of an automobile thereby to search other vehicles etc. on a road on which the automobile runs (for example, see JP-A-Sho. 59-37471 and JP-A-Hei. 1-197684). In order to perform accurate search, it is necessary to make a searching range utilizing a radio wave or a laser beam narrow in a beam shape. When the search range is made narrow, at the time of attaching the radar apparatus for an automobile to the body of the automobile, it is required to adjust the radar apparatus so as not to deviate a beam axis in the vertical direction. When the beam axis deviates in the lower direction, only the road surface near the automobile is mainly searched. In contrast, when the beam axis deviates in the upper direction, an upper area away from the road surface is searched. Thus, unnecessary stationary objects such as a sign, signal, elevated road, which locate at higher positions and do not prevent the running of vehicles, are detected as obstacles and hence falling objects etc. on the road may not be searched. Although in most cases the horizontal direction is set as a reference direction of the beam axis, a direction slightly slanted from the horizontal direction is sometimes set as the reference direction. It is proved that an allowable range of the deviation of the beam axis is in a range of 1 to 2 degrees.

As methods of adjusting deviation of the beam axis in the lower and upper directions caused at the time of attaching the radar apparatus for an automobile to the body, there are known the following three methods, for example:

(1) a method of attaching the radar apparatus horizontally by using a spirit level, (2) a method in which a search signal radiated from the radar apparatus is received by an antenna etc. disposed at a predetermined position in the forward direction of the automobile thereby to adjust the radar apparatus so that an output of the received signal becomes maximum, and (3) a method in which a reflection member is disposed at a predetermined position in the forward direction of the automobile so that a search signal radiated from the radar apparatus is reflected by the reflection member and the radar apparatus is adjusted so that an output of the reflection signal received by the radar apparatus becomes maximum. According to the method (1), the posture of the body of an automobile is kept horizontally, then a reference direction indicator such as a spirit level, which indicates the reference direction such as the horizontal direction based on the direction of the gravity of the earth, is placed on the reference surface set at the casing of the radar apparatus, and the attachment of the radar apparatus to the casing is adjusted so that the reference direction indicator indicates the reference direction.

SUMMARY OF THE INVENTION

According to each of the methods (2) and (3) among the aforesaid beam axis direction adjusting methods, the adjustment can be performed accurately even when a degree of the deviation of the beam axis of the radar apparatus itself is large. However, it is necessary to dispose an antenna for the adjustment, and further since the predetermined position is required to be several tens meters away from the vehicle body, a large space is required. In the case of performing the attachment of the radar apparatus for an automobile in a dealer for selling automobiles or are pair shop for performing the maintenance of automobiles, an adjustment equipment such as the antennal or the reflection member which requires to secure a large space is an expensive equipment difficult to bear.

Like the aforesaid method (1), according to a method of using a reference direction indicator such as a spirit level at the time of attaching the radar apparatus to a body, the cost for the adjustment equipment can be made cheap. However, at the time of assembling the radar apparatus for an automobile into the body, it is difficult to coincide the beam axis accurately with the reference direction, which is determined based on the casing. If the accuracy of the mechanical portion were improved, there would arise problems that a cost of the apparatus raises due to the increase of the processing number such as work and the outer size of the casing becomes large.

Accordingly, the invention provides a radar apparatus for an automobile, and an attachment direction adjuster and an attachment direction adjusting method for the radar apparatus, which can adjust a search direction in a simple manner at a low cost.

According to a first aspect of the invention, a radar apparatus for a vehicle includes a casing, a correction member, and a selection indication. The casing includes a functional portion, which performs searching, and a reference surface. The correction member includes a plurality of correction surfaces. The selection indication indicates which one of the correction surfaces and the reference surface an attachment-direction adjustor is to be placed on during an attachment operation of the radar apparatus to the vehicle.

As described above, when the radar apparatus is attached to the vehicle, it is necessary to adjust deviation of the beam axis. When the radar apparatus of the first aspect is attached to a vehicle, an attachment-direction adjustor is placed on one of the correction surfaces and the reference surface, which is indicated by the selection indication and the posture of the radar apparatus is adjusted. As a result, the deviation of the beam axis can be corrected and the functional portion can perform searching in a predetermined direction with respect to the vehicle. There is no need to adjust an attachment direction of the radar apparatus while directly measuring a searching direction of the functional portion. Therefore, it becomes possible to adjust the attachment direction of the radar apparatus easily at low cost.

According to a second aspect of the invention, in the radar apparatus of the first aspect, the correction member further includes an attachment surface, which is different from the correction surfaces and is in contact with the reference surface when the correction member is placed on the reference surface.

According to a third aspect of the invention, in the radar apparatus of the second aspect, angles between the correction surfaces and the attachment surface are different from each other. Since the angles are different from each other, the adjustment direction of the radar apparatus can be adjusted easily in various situations.

According to a fourth aspect of the invention, in the radar apparatus of the first aspect, the correction member includes a plurality of correction sub-members each having the correction surface.

According to a fifth aspect of the invention, in the radar apparatus of the first aspect, the selection indication further indicates a direction in which the correction member is to be oriented when the attachment-direction adjustor is placed on the one of the correction surfaces and the reference surface. For example, it is assumed that an angle between one correction surface and the reference surface is θ. Since the selection indication indicates the direction in which the correction member is to be oriented, the one correction surface can adjust variation of ±θ.

According to a sixth aspect of the invention, in the radar apparatus of the first aspect, the casing is formed with the correction member integrally. The sixth aspect of the invention can prevent a user from losing the correction member.

According to a seventh aspect of the invention, in the radar apparatus of the first aspect, the selection indication is a predetermined color, which is coated on the one of the correction surfaces. Since the correction surface to be used is coated with the predetermined color, a user can find the correction surface to be used easily.

According to an eighth aspect of the invention, in the radar apparatus of the first aspect, the correction surfaces are coated with different colors from each other. The selection indication displays one of the colors.

According to a ninth aspect of the invention, in the radar apparatus of the first aspect, the functional portion irradiates a beam of radio wave to perform the searching.

According to a tenth aspect of the invention, in the radar apparatus of the first aspect, the selection indication indicates which one of the correction surfaces and the reference surface the attachment-direction adjustor is to be placed on, in order to match an axis of the irradiated beam and a reference direction.

According to an eleventh aspect, the radar apparatus of the first aspect further includes a bracket, which is to be directly attached on the vehicle. The casing further includes screw holes. The bracket includes screw holes corresponding to the screw holes of the casing. One of the screw holes of bracket has an elongated shape. Therefore, a user can adjust the attachment direction of the radar apparatus by loosening and fastening the screws.

According to a twelfth aspect of the invention, the radar apparatus of the first aspect further includes a spirit level as the attachment-direction adjustor.

According to a thirteenth aspect of the invention, a radar apparatus for a vehicle includes a casing and a correction member. The casing includes a functional portion, which performs searching, and a reference surface. The correction member includes a correction surface, which an attachment-direction adjustor is placed on during an attachment operation of the radar apparatus to the vehicle.

According to a fourteenth aspect of the invention, the radar apparatus of the thirteenth aspect, the functional portion irradiates a beam of radio wave to perform the searching.

According to a fifteenth aspect of the invention, in the radar apparatus of the fourteenth aspect, the attachment-direction adjustor is placed on the correction surface in order to match an axis of the irradiated beam and a reference direction.

According to a sixteenth aspect of the invention, in the radar apparatus of the thirteenth aspect, the correction member further includes an attachment surface, which is in contact with a surface of the casing when the correction member is placed on the surface of the casing. An angle between the correction surface and the attachment surface is not equal to zero degree.

DETAILED DESCRIPTION OF THE PREFERRED EMBODIMENT

The embodiments of the invention will be explained with reference to the accompanying drawings. In the figures, portions corresponding to those having been explained are referred to by the common symbols, with explanation thereof being omitted.

Figure 1A:
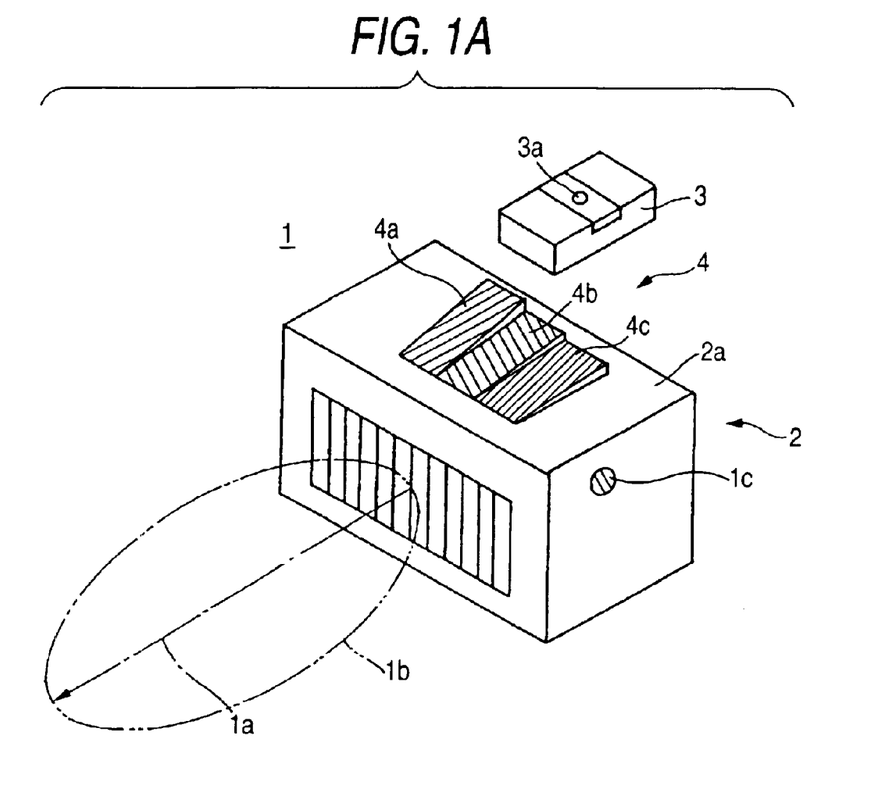
FIGS. 1A–1C are a perspective view showing the schematic configuration of a radar apparatus 1 for an automobile according to an embodiment of the invention, a side view showing a schematic attachment state thereof to a vehicle body, and a side view of the casing 2 to which the correction member 4 is attached.
Figure 1B:
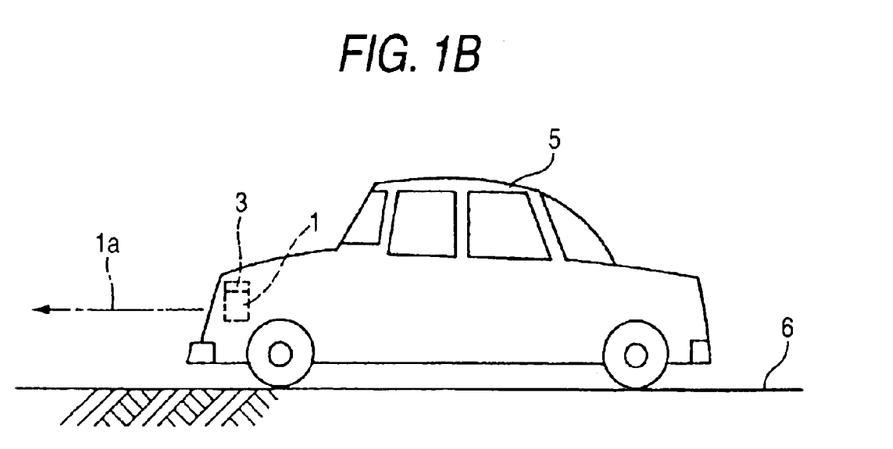

FIG. 1A shows the schematic configuration of a radar apparatus 1 for an automobile according to an embodiment of the invention. FIG. 1B shows an attachment state thereof.

As shown in FIG. 1A, the radar apparatus 1 for an automobile according to the embodiment makes a radio wave of a millimeter wave band, for example, narrow in a beam shape, then irradiates the radio wave as a search beam 1b in a direction along a beam axis 1a, and receives a reflection wave reflected by a target such as an object existing in a beam radiation area to detect the position of the target, the distance to the target or the like. As the search beam, not only the radio wave but also other waves such as electromagnetic wave including light such as laser light, which are transmitted in the space and have been used for a radar mounted on an automobile, may also be used in the similar manner. The radar apparatus 1 for an automobile contains a functional portion, such as an antenna, for performing the search within a casing 2. A reference surface 2a is formed on the outer surface of the casing 2. On this reference surface, a spirit level 3, for example, is disposed which serves as a predetermined attachment direction adjuster used for adjusting the attachment direction at the time of attaching the casing 2 to the body of an automobile.

When the spirit level 3 is disposed on the reference surface 2a of the casing 2 so that a bubble 3a of the spirit level 3 is seen at the center of a window, it is understood that the reference surface 2a on which the bottom surface of the spirit level 3 is disposed forms a horizontal surface.

The beam axis 1a indicating the search direction of the radar apparatus 1 for an automobile is required to be set so as to be directed to a predetermined direction such as the horizontal direction. The accuracy of the inclination of the beam axis required at the time of the setting is quite strict, that is, an allowable deviation is almost in a range of 1 to 2 degrees. It is quite difficult to set the direction of the beam axis with such a degree of the accuracy when assembling the functional portion within the casing 2. Therefore, the beam axis may deviate from the predetermined direction by several degrees. In view of this fact, a correction member 4 is used in order to correct such a deviation at the time of attaching the spirit level 3 to the reference surface 2a. The correction member 4 has a plurality of, for example, three correction surfaces 4a, 4b and 4c, which have respectively different inclination angles and on each of which the spirit level 3 can be attached. Each of the correction surfaces is formed in an almost wedge shape. The bottom surface of the correction member 4 serves as an attachment surface 4d to be attached to the reference surface 2a.

Figure 1C:
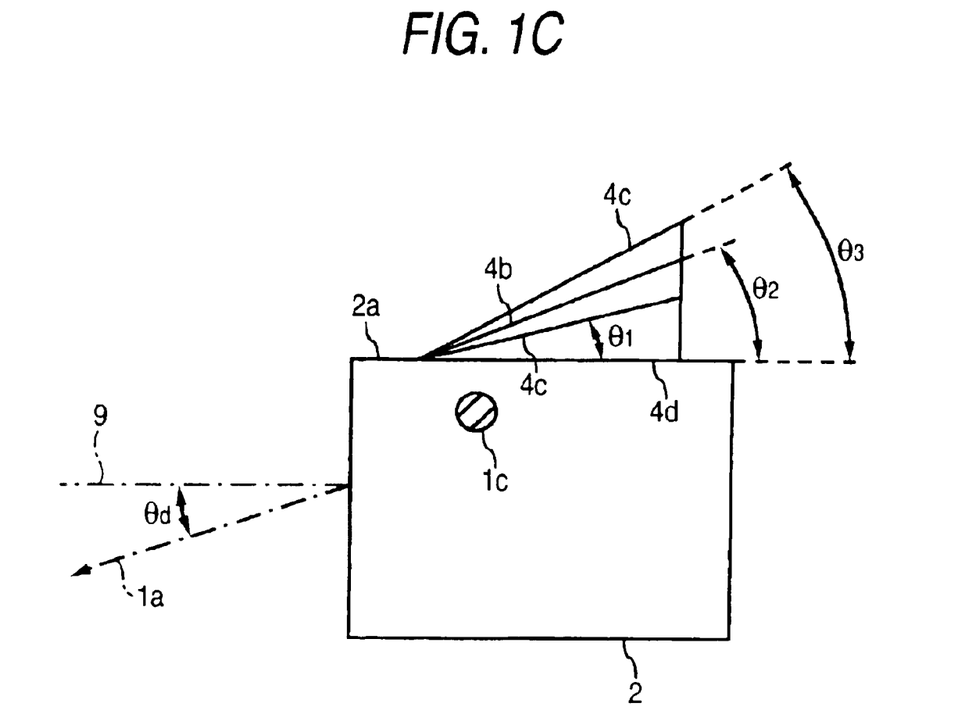

On the supplier side such as the manufacturing factory of the radar apparatuses 1 for automobiles, the direction of the beam axis 1a of the search beam 1b is measured in operation test. In this measurement, the spirit level 3 is attached to the reference surface 2a and the posture of the casing 2 is adjusted so that the reference surface 2a becomes horizontal. At this time, the degree of deviation of the direction of the beam axis 1a with respect to the predetermined direction is determined in corresponding to one of the slanted angles of the correction surfaces 4a, 4b and 4c. FIG. 1C shows a side view of the casing 2 to which the correction member 4 is attached. Reference numeral 9 denotes the predetermined direction such as the horizontal direction. Angles between the correction surfaces 4a, 4b, 4c and the attachment surface 4d are $\theta_1$, $\theta_2$, and $\theta_3$, respectively. It is assumed that after the posture of the casing 2 is adjusted so that the reference surface 2a becomes horizontal, the beam axis 1a of the search beam 1b is deviated from the predetermined direction 9 by $\theta_d$. Then, the supplier compares $\theta_d$ with 0 degree, $\theta_1$, $\theta_2$, and $\theta_3$ and determines which of 0 degree, $\theta_1$, $\theta_2$, and $\theta_3$ is closest to $\theta_d$. It is noted that 0 degree corresponds to the reference surface 2a. A selection indication 1c is added to a part of the casing 2 in accordance with the result of the determination. That is, the selection indication 1c indicates which of 0 degree, $\theta_1$, $\theta_2$, and $\theta_3$ is closest to $\theta_d$. The correction surfaces 4a, 4b and 4c may be coated with different colors, for example, respectively and the color of the corresponding one of the correction surfaces may be designated by the selection indication 1c.

As shown in FIG. 1B, the radar apparatus 1 for an automobile is in use attached to the radiator grill, for example, of the vehicle body 5 of an automobile. In general, a repair shop 6 for automobiles, at which the radar apparatus 1 for automobiles is attached, has a horizontal road 6. At the time of attaching the radar apparatus 1 for an automobile, the adjustment of the radar apparatus is performed using the spirit level 3 in the following manner. The vehicle body 5 is placed on the horizontal road 6. Then, the adjustment is performed so that the spirit level 3 indicates the horizontal state. In this respect, in fact, the spirit level 3 is attached to one of the correction surfaces 4a, 4b and 4c selected in accordance with the selection indication 1c shown in FIG. 1A, and the attachment surface 4d of the correction member 4, in which the spirit level 3 is attached to the one of the correction surfaces 4a, 4b and 4c, is attached to the reference surface 2a of the casing 2.

Figure 2:
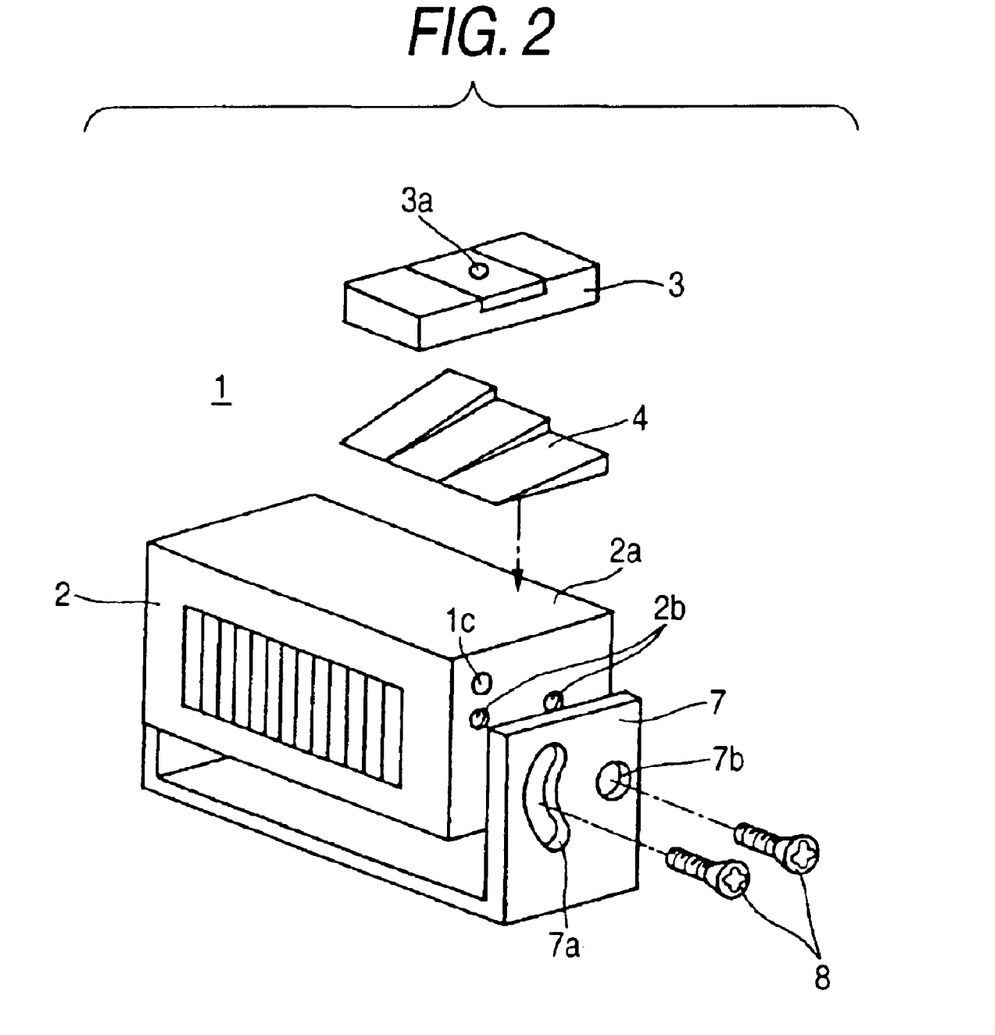
FIG. 2 is a perspective view showing a configuration used at the time of attaching the radar apparatus 1 for an automobile of FIGS. 1A to 1C to a vehicle body.

FIG. 2 shows the configuration used at the time of attaching the radar apparatus 1 for an automobile. The casing 2 of the radar apparatus 1 for an automobile is arranged so that the upper surface thereof serves as the reference surface 2a. Screw holes 2b are formed at each of the both side surfaces thereof. A bracket 7 formed by bending a metal plate is used as an attachment member for attaching the casing 2 to the vehicle body 5 shown in FIG. 1B. The bracket 7 is bent in an almost U-shape and attached to the casing in such a manner that the parallel both sides thereof are disposed along the side surfaces of the casing 2, respectively. Each of the both side portions of the bracket 7 covering the side surfaces of the casing 2 includes an adjusting hole 7a and an attachment hole 7b in corresponding to positions of the screw holes 2b, respectively. The adjusting hole 7a is an elongated hole bent in an arc shape. Bolts 8 are capable of passing through the adjusting hole 7a and the attachment hole 7b, respectively. The bolts 8 are engaged with the screw holes 2b of the casing 2, respectively. Since each of the width of the adjusting hole 7a and the diameter of the attachment hole 7b is smaller than the diameter of the head potion of the bolt 8, the casing 2 can be fixed to the bracket 7 by screwing the bolts 8 into the screw holes 2b.

Figure 3A:
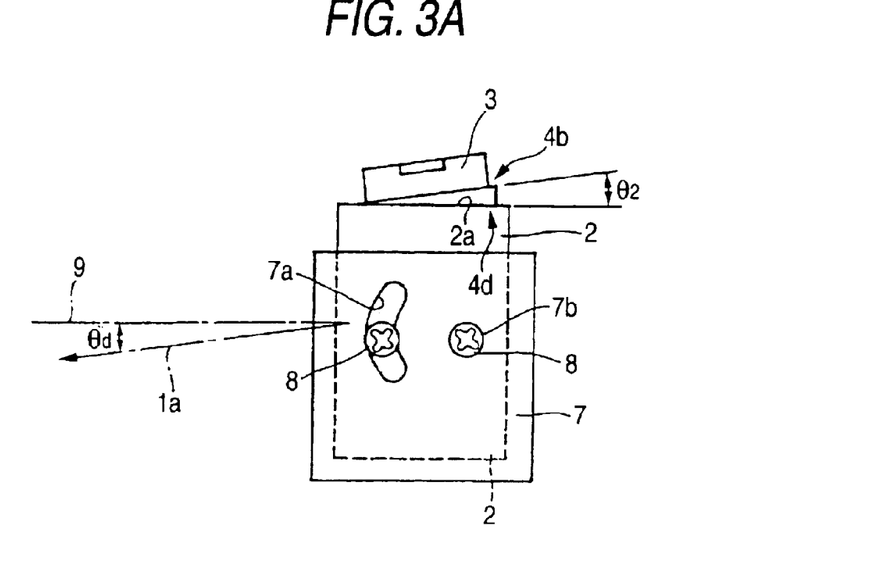
FIGS. 3A–3B are side views showing a state for adjusting the direction of a beam axis 1a at the time of attaching a casing 2 shown in FIG. 1A–1C to a vehicle body 5 shown in FIG. 1 through a bracket 7 shown in FIG. 2.
Figure 3B:
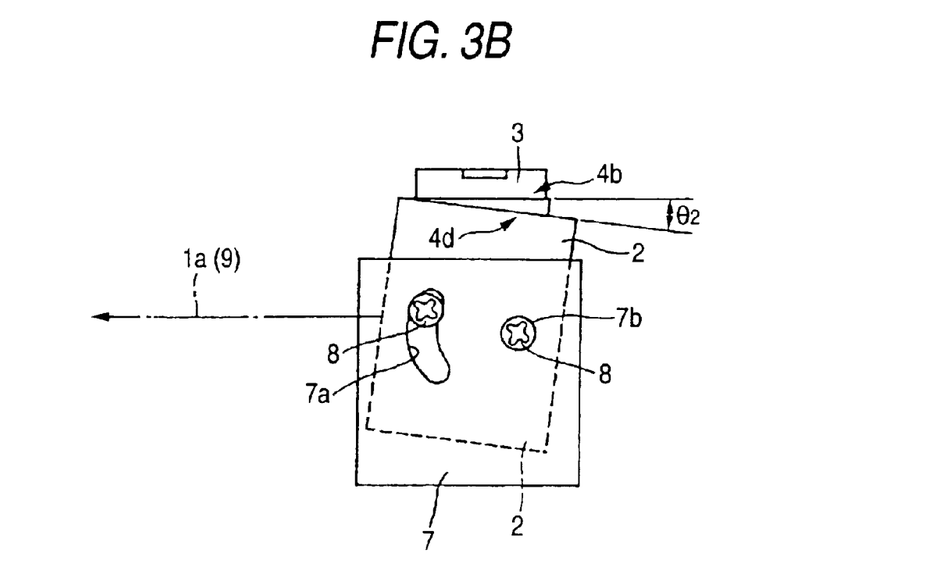

FIGS. 3A–3B show a state for adjusting the direction of the beam axis 1a at the time of attaching the casing 2 to the vehicle body 5 shown in FIG. 1B through the bracket 7. The casing 2 is attached to the bracket 7 so that the reference surface 2a directs upward. The correction member 4 is put on the reference surface 2a. Then, the spirit level 3 is attached to one of the correction surfaces 4a, 4b, and 4c in accordance with the selection indication 1c. As described above, if the casing 2 is adjusted so that the reference surface 2a becomes horizontal, the beam axis 1a deviates by $\theta_d$ from the predetermined direction 9 such as the horizontal direction. Here, it is assumed that the selection indication 1c designates the correction surface 4b. In other words, $\theta_d$ is closest to $\theta_2$, which is between the attachment surface 4d and the correction surface 4b, among 0 degree, $\theta_1$, $\theta_2$, and $\theta_3$. FIG. 3A shows a state where the reference surface 2a is horizontal and the spirit level 3 is put on the correction surface 4b. In this state, the bolts 8 are loosened and the posture of the casing 2 is adjusted so that the bubble 3a of the spirit level 3 put on the correction surface 4b is seen at the center of the window. After this adjustment, the bolts 8 are tightened and the casing 2 is fixed to the bracket 7. As a result, the beam axis 1a coincides with the predetermined direction 9 within the allowable deviation (tolerance). FIG. 3B shows a state after the completion of the adjustment using the spirit level 3 put on the correction surface 4b.

In the above description, an error of the spirit level 3 is not considered. However, in general, the spirit level 3 has an error to some extent. The error of the spirit level 3 maybe considered as follows. Although the slanted angle of the correction member 4 is shown exaggeratedly in FIGS. 1 to 3, it is supposed that actually the correction surfaces 4a, 4b and 4c have the slanted angles of 6 degrees, 4 degrees and 2 degrees, for example, with respect to the attachment surface 4d, respectively. Further, it is supposed that the error of the spirit level 3 is 1 degree and the allowable range (tolerance) of the deviation of the beam axis 1a is 2 degrees. When the deviation of the angle of the beam axis 1a is in a range of 0 to 1 degree, the spirit level 3 is directly put on the reference surface 2a without using the correction member 4. When the deviation of the angle of the beam axis 1a is in a range of 1 to 3 degrees, a range of 3 to 5 degrees and a range of 5 to 7 degrees, the correction surfaces 4a, 4b and 4c are used, respectively.

Figure 4:
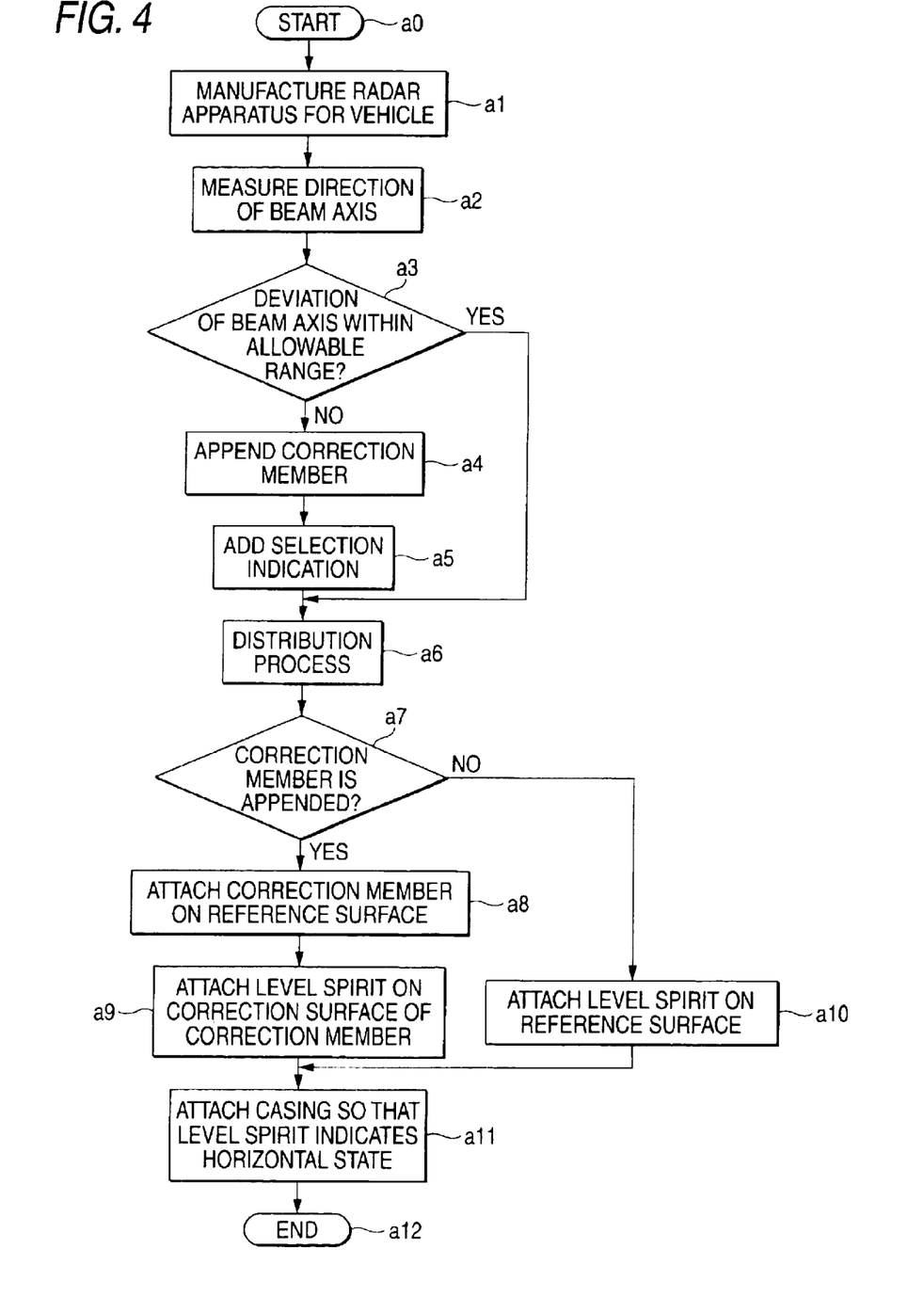
FIG. 4 is a flow chart showing the entire procedure of attaching the radar apparatus 1 for an automobile shown in FIG. 1 to the vehicle body.

FIG. 4 shows the entire procedure of attaching the radar apparatus 1 for an automobile to the vehicle body 5 of an automobile as shown in FIG. 1B in this embodiment. The procedure is started from step a0, and the radar apparatus 1 for an automobile is manufactured in step a1. In step a2, on the supplier side such as a manufacturing factory, the direction of the beam axis 1a is measured in test and examination of the radar apparatuses 1 for automobiles. This measurement can be performed by the method (2) described in the background of the invention. The direction of the beam axis 1a is measured in a state where the spirit level 3 is disposed on the reference surface 2a of the casing 2 and the spirit level 3 indicates the horizontal state. Thus, a deviation between a direction (the predetermined direction 9), to which the beam axis 1a should be directed, and the actual direction of the beam axis 1a can be determined.

Instep a3, it is judged as to whether or not a direction of the beam axis 1a, which is the search direction, deviates within the allowable range (tolerance) when the spirit level 3 is put on the reference surface 2a of the casing 2 and the casing 2 is adjusted using the spirit level so that the reference surface 2a becomes horizontal. When it is judged that the degree of the deviation is out of the allowable range (tolerance), the correction member 4 is appended to the product in step a4, and the selection indication 1c indicating which one of the correction surfaces 4a, 4b and 4c of the correction member 4 is to be used is added in step a5. The selection indication 1c may not be added to the casing 2 as shown in FIG. 1A but may be directly added to the correction member 4. For example, only selected one of the correction surfaces 4a, 4b and 4c may be coated with a color different from the others. Alternatively, only selected one of the correction surfaces may be indicated by a character(s) or a figure(s). Further, a selection information indicating which one of the correction surfaces 4a, 4b and 4c is to be used may be described on a container box or a document such as an instruction manual attached to the product. Such information may be a bar code, which is readable by a bar code reader.

After step a5 or if it is judged at step a3 that the degree of the deviation of the beam axis 1a is within the allowable range (tolerance), the radar apparatus 1 for an automobile is transferred to the user side through a distribution process in step a6. On the user side, it is judged whether or not the correction member 4 is appended to the radar apparatus 1 for an automobile in step a7. When it is judged that the correction member 4 is appended, the correction member 4 is attached to the reference surface 2a at the time of attaching the casing 2 to the vehicle body 5 in step a8. Then, in step a9, the spirit level 3 is attached to the selected one of the correction surfaces 4a, 4b and 4c of the correction member 4. When it is judged that the correction member 4 is not appended in step a7, the spirit level 3 is directly attached to the reference surface 2a in step a10. When the spirit level 3 is attached in step a9 or a10, the casing 2 is attached to the vehicle body 5 through the bracket 7 so that the spirit level 3 indicates the horizontal state in step a11. Then, the procedure is terminated in step a12.

The correction members 4 may be distributed to the user side in advance. In this case, it is not necessary to append the correction members 4 on the supplier side in step a4. In contrast, in the user side, the judgment as to whether or not the correction member 4 is to be used may be made depending on the presence or non-presence of the selection indication 1c instead of judging whether or not the correction member 4 is appended in step a7, In place of the correction member 4 having a plurality of the correction surfaces 4a, 4b, 4c, a plurality of correction members each having a single correction surface may be prepared. In this case, one of the correction members 4 may be selected in accordance with the selection indication 1c.

As explained above, at the time of attaching the radar apparatus 1 for an automobile to the vehicle body 5, the level spirit 3 is put on one of the reference surface 2a and the correction surfaces 4a, 4b, 4c on the basis of the appended information, so that the beam axis 1a can be corrected to reduce the deviation.

When the spirit level 3 is disposed on the casing 2 in a manner of correcting its disposing position and then the attachment state of the casing 2 to the vehicle body 5 is adjusted so that the spirit level 3 indicates the horizontal state, even when the beam axis 1a deviates at the time of incorporating the radar apparatus within the casing 2, the search direction can be made coincide with the predetermined direction as well as the correction of the deviation of the beam axis. The equipment for measuring the deviation of the beam axis may be provided on the supplier side such as a manufacturing factory of the radar apparatuses 1 for automobiles. On the user side where the radar apparatus 1 for an automobile is attached to the vehicle body 5, one of the correction surfaces 4a, 4b and 4c of the correction member 4 being appended or distributed in advance is selected based on the selection indication 1c, then the attachment direction adjuster such as the spirit level 3 is attached and the attachment direction of the casing 2 with respect to the vehicle body 5 is adjusted by using the adjuster, whereby the searching direction of the radar apparatus 1 for an automobile using the search beam 1b can be adjusted correctly. Thus, the searching direction can be adjusted simply at a low cost.

Figure 5A:
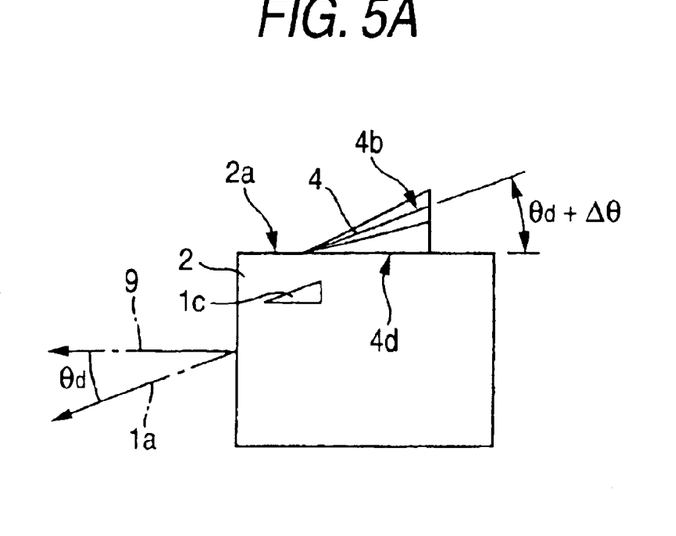
FIGS. 5A–5B are simplified side views showing that different corrections can be made by changing the attachment direction of the same correction member 4 in the embodiment shown in FIG. 1.
Figure 5B:
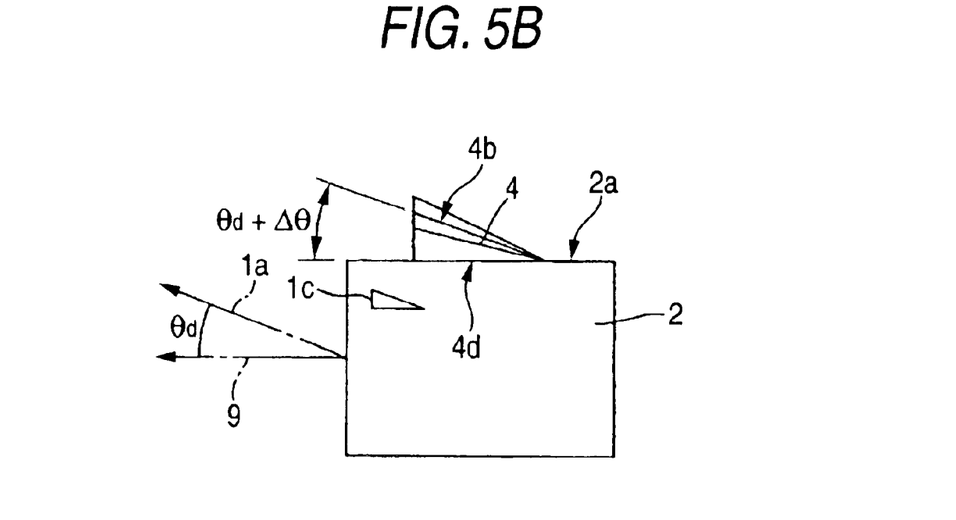

FIGS. 5A–5B are diagrams showing that the beam axis can be corrected in a different angular range by changing the attaching direction of the same correction member 4 to the reference surface 2a in the embodiment shown in FIG. 1. FIG. 5A shows a state where, in order to correct the beam axis 1a inclined downward by an angle $\theta_d$ with respect to the reference direction 9, each of the correction surfaces 4a, 4b and 4c of the correction member 4 is slanted so as to be lowered on the front surface side of the casing 2 and then attached to the reference surface 2a. FIG. 5B shows a state where, in order to correct the beam axis 1a inclined upward by the angle $\theta_d$ with respect to the reference direction 9, each of the correction surfaces 4a, 4b and 4c of the correction member 4 is slanted so as to be heightened on the front surface side of the casing 2 and then attached to the reference surface 2a. In other words, deviated angles of $\pm\theta_d$ can be corrected by using the same correction member 4, for example, by selecting the correction surface 4b having the slanted angle of $\theta_d+\Delta\theta$. In this case, when there is no error in the horizontal indication of the spirit level 3 and a value of $\Delta\theta$ is small, an amount of the deviation of the beam axis of angle ed can be reduced to $\Delta\theta$. The selection indication 1c may further indicate the disposing direction of the correction member 4. Of course, the correction member 4 is not necessary to use when the deviation is within the allowable range.

Figure 6:
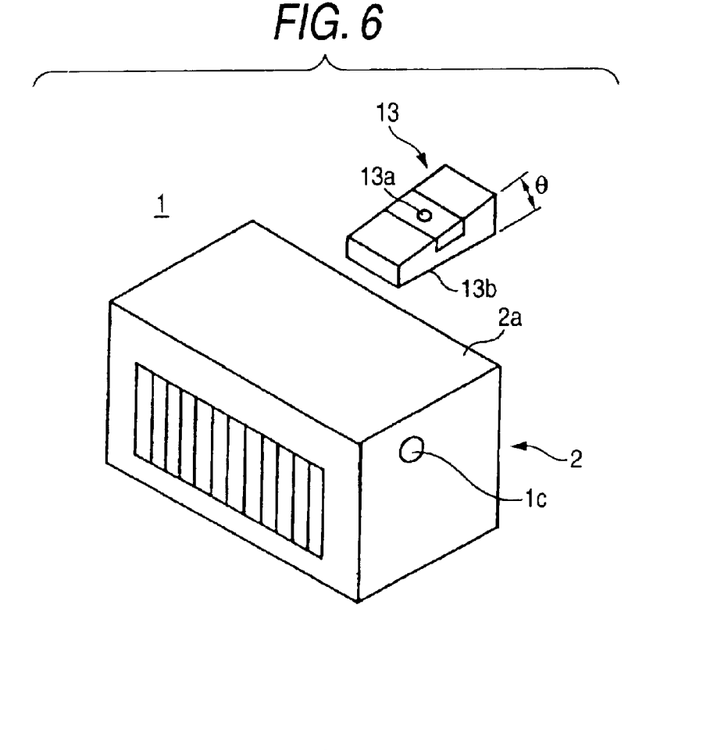
FIG. 6 is a perspective view showing the schematic configuration of a spirit level 13, which is an attachment adjuster for performing attachment adjustment of a radar apparatus 11 for an automobile according to another embodiment of the invention

FIG. 6 is a diagram showing the schematic configuration of another embodiment of the invention. According to this embodiment, a function of correcting the deviation of a beam axis is provided at a spirit level 13 itself, which is attached to the reference surface 2a of the casing 2. That is, the spirit level 13 is arranged in a manner that a bottom surface 13b thereof is inclined by an angle θ with respect to the horizontal plane when a bubble 13a is positioned at the center of the window of the spirit level. A plurality of such the spirit levels 3 respectively having different slanted angles θ are provided in advance. One of the spirit levels is selected in accordance with the selection indication 1c and the attachment direction of the casing 2 is adjusted at the time of attaching the radar apparatus 1 for an automobile to the vehicle body 5. The selection indication 1c and the adjustment of the attachment direction of the casing 2 may be performed in the similar manner to the embodiment shown in FIGS. 1A–1C Like the case of FIG. 5A–5B when the attaching direction of the spirit level 13 to the reference surface 2a is changed, deviated angles of ±θ can be corrected by using the same spirit level 13.

Figure 7:
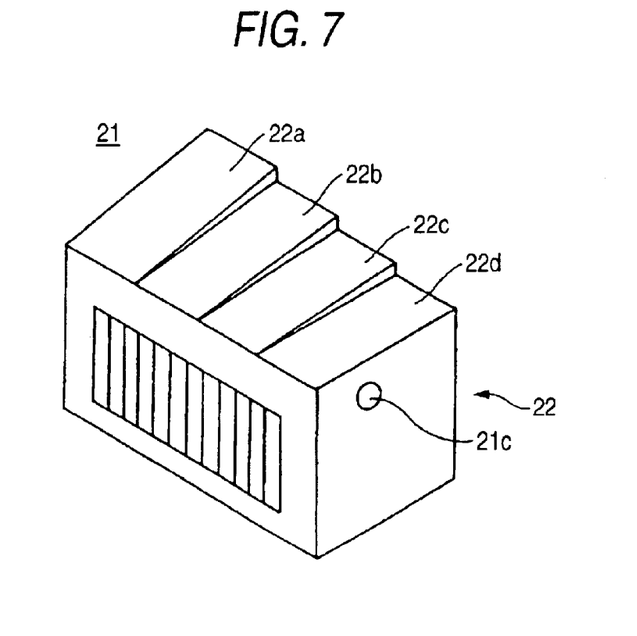
FIG. 7 is a perspective view showing the schematic configuration of a radar apparatus 21 for an automobile according to still another embodiment of the invention

FIG. 7 is a diagram showing the schematic configuration of a radar apparatus 21 for an automobile according to still another embodiment of the invention. According to this embodiment, the reference surface of a casing 22 itself is divided into a plurality of sections 22a, 22b, 22c and 22d and the respective reference surfaces 22a, 22b, 22c and 22d have different slanted angles, respectively. One of the reference surfaces 22a, 22b, 22c and 22d on which the spirit level 3 as shown in FIG. 1 is attached is selected in accordance with a selection indication 21c. The selection indication 21c may be a seal mark to be pasted on one of the reference surfaces 22a, 22b, 22c and 22d. The casing 22 can be attached to the vehicle body 5 as shown in FIG. 1B in the similar manner as the casing 2 in FIG. 1A–1C.

In the aforesaid explanation, although the attachment angle is adjusted so that the reference surface is placed in a horizontal state, the attachment angle is adjusted so that the reference surface is directed to another direction such as a vertical direction. Alternatively, the attachment direction may be adjusted with reference to a particular portion of a vehicle body. Further, at the time of adjusting the reference surface so as to be positioned at a predetermined height from the road surface, the height of the beam axis 1a from the road surface etc. may be adjusted so as to be a predetermined value by using a spacer etc. for correcting the error within the casing.

What is claimed is:

1. A radar apparatus for a vehicle, comprising:
    a casing including:
        a functional portion which performs searching; and
        a reference surface;
    a correction member including a plurality of correction surfaces; and
    a selection indication, which indicates which one of the correction surfaces and the reference surface an attachment-direction adjustor is to be placed on during an attachment operation of the radar apparatus to the vehicle.

2. The radar apparatus according to claim 1, wherein the correction member further includes an attachment surface, which is different from the correction surfaces and is in contact with the reference surface when the correction member is placed on the reference surface.

3. The radar apparatus according to claim 2, wherein angles between the correction surfaces and the attachment surface are different from each other.

4. The radar apparatus according to claim 1, wherein the correction member includes a plurality of correction submembers each having the correction surface.

5. The radar apparatus according to claim 1, wherein the selection indication further indicates a direction in which the correction member is to be oriented when the attachment-direction adjustor is placed on the one of the correction surfaces and the reference surface.

6. The radar apparatus according to claim 1, wherein the casing is formed with the correction member integrally.

7. The radar apparatus according to claim 1, wherein the selection indication is a predetermined color, which is coated on the one of the correction surfaces.

8. The radar apparatus according to claim 1, wherein:
    the correction surfaces are coated with different colors from each other; and
    the selection indication displays one of the colors.

9. The radar apparatus according to claim 1, wherein the functional portion irradiates a beam of radio wave to perform the searching.

10. The radar apparatus according to claim 9, wherein the selection indication indicates which one of the correction surfaces and the reference surface the attachment-direction adjustor is to be placed on, in order to match an axis of the irradiated beam and a reference direction.

11. The radar apparatus according to claim 1, further comprising:
    a bracket, which is to be directly attached on the vehicle, wherein:
    the casing further includes screw holes;
    the bracket includes screw holes corresponding to the screw holes of the casing; and
    one of the screw holes of bracket has an elongated shape.

12. The radar apparatus according to claim 1, further comprising a spirit level as the attachment-direction adjustor.

13. A radar apparatus for a vehicle, comprising:
    a casing including:
        a functional portion which performs searching; and
        a reference surface;
    a correction member including a correction surface which an attachment-direction adjustor is placed on during an attachment operation of the radar apparatus to the vehicle.

14. The radar apparatus according to claim 13, wherein the functional portion irradiates a beam of radio wave to perform the searching.

15. The radar apparatus according to claim 14, wherein the attachment-direction adjustor is placed on the correction surface in order to match an axis of the irradiated beam and a reference direction.

16. The radar apparatus according to claim 13, wherein:
    the correction member further includes an attachment surface, which is in contact with a surface of the casing when the correction member is placed on the surface of the casing; and
    an angle between the correction surface and the attachment surface is not equal to zero degree.

* * * * *